Sept. 2, 1969           P. W. MOSSEY           3,464,441

OPTICAL PORT FOR USE IN HIGH VELOCITY STREAMS

Filed Dec. 19, 1967           2 Sheets-Sheet 1

INVENTOR.
PAUL W. MOSSEY

BY Harry A. Herbert Jr
Jacob N. Erlich and
ATTORNEYS

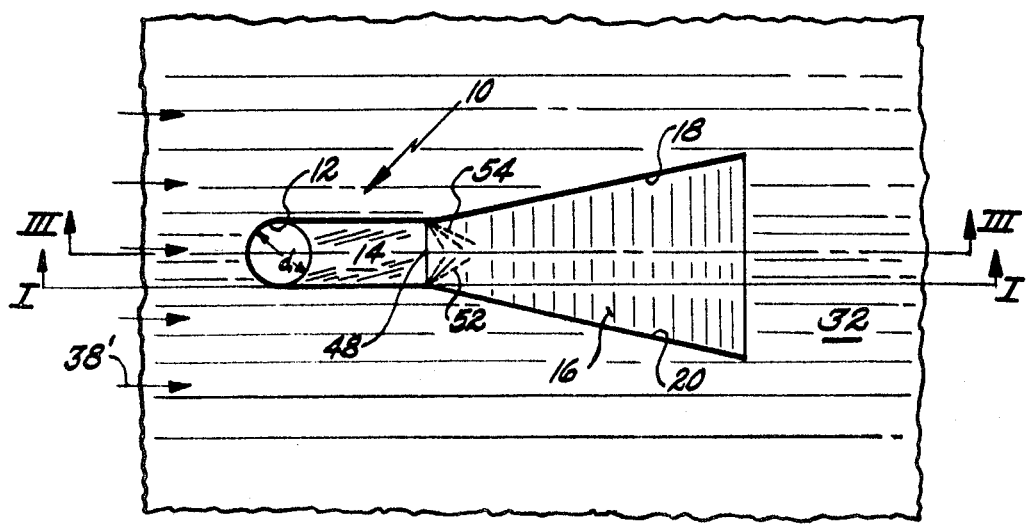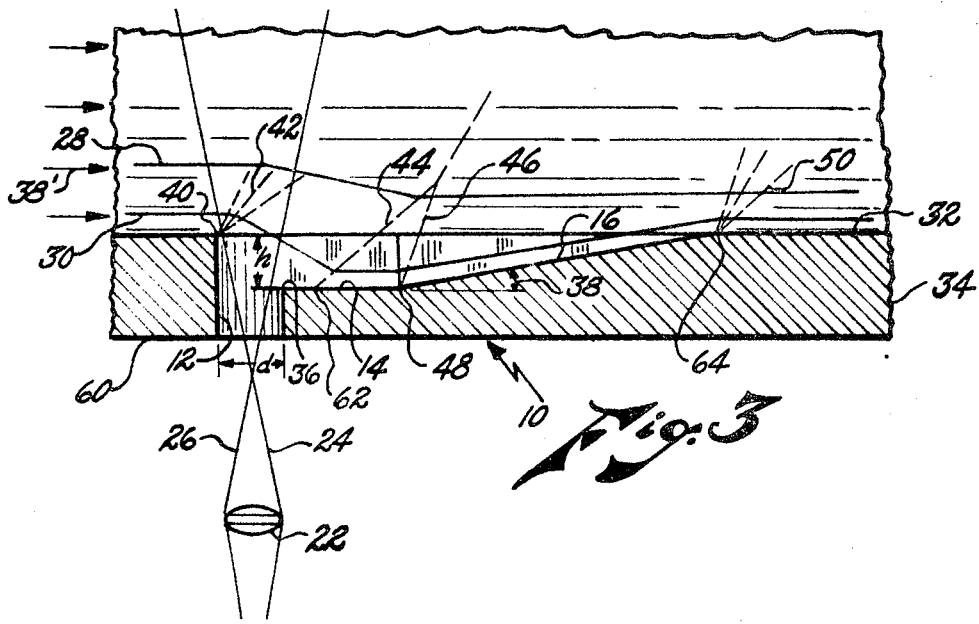

United States Patent Office 3,464,441
Patented Sept. 2, 1969

3,464,441
OPTICAL PORT FOR USE IN HIGH VELOCITY STREAMS
Paul W. Mossey, Cincinnati, Ohio, assignor to the United States of America as represented by the Secretary of the Air Force
Filed Dec. 19, 1967, Ser. No. 691,889
Int. Cl. E03b 7/07; F16k 37/00; F17d 3/00
U.S. Cl. 137—559
5 Claims

ABSTRACT OF THE DISCLOSURE

An optical port for use in high velocity, high temperature gas streams having a porthole in a wall adjacent the gas stream, a first channel directly adjacent the porthole and having a straight floor therein substantially parallel to the surface of the wall adjacent the gas stream and a second channel directly adjacent the first channel and having an upwardly sloping floor with diverging walls terminating at the surface of the wall adjacent the gas stream.

Background of the invention

This invention relates generally to high velocity gas streams and, more particularly, to optical ports for use therewith.

There are many instances when it becomes necessary to place a viewing or optical porthole in a cooled wall adjacent to a high velocity, high temperature gas stream, and additionally require that this gas stream not be disrupted or interfered with. Interference is often a result of certain types of discontinuities in the wall. One particular type of interference which is undesirable when observing supersonic flow is the formation of a compression shock wave in view of or upstream of the optical porthole location. The shock wave disrupts the flow of gas and causes a sharp increase in temperature and in many instances a reduction in velocity of the stream.

In making certain optical measurements, for example, such as of peak tempertature in a supersonic velocity gas stream, it becomes extremely necessary that the temperature in the gas stream adjacent the optical port remain equal to or less than the peak temperature to be measured. Another use for an optical port in a wall adjacent a high velocity gas stream is, for example, in a supersonic aircraft in which a camera is placed within the aircraft adjacent the porthole for photographing objects without the aircraft. In such a case, it is necessary that the temperature of the gas stream not increase to such an extent as to distort the gas stream adjacent the porthole through which the camera is photographing.

Optical ports which have been used previously in high temperature, high velocity gas streams have consisted of a plain hole in a cooled wall. Through this hole the optical measurements were taken or in the case of photography the photographs were made.

An undesirable compression shock wave would take place in view of the hole when the high velocity gas stream approached the outer surface or wall of the hole. The temperature of the high velocity gas stream adjacent the hole would then greatly increase. This would make it virtually impossible to get proper measurements of peak temperature in the gas stream. In the case of photography the high temperature would distort the air stream so that photographs could not be taken. In order to prevent such a compression shock wave from forming, it was necessary to make the hole diameter of the optical port much smaller than the thickness of the gas boundary layer adjacent ot the hole. In many experiments, this boundary layer is typically less than 15/1000 of one inch thick, forcing an impractically small hole size for the optical port. An alternative solution which does not restrict the hole diameter is the flush mounted window. However, this solution is limited to only moderate temperatures and velocity due to cooling difficulties. It is quite apparent that the problem involved is that large optical ports were needed which did not cause the formation of a compression shock wave in view of or upstream of the optical porthole.

Summary of the invention

The present invention solves this problem by providing a uniquely shaped optical port. Such an optical port prevents the forming of the undesirable compression shock wave in view of or upstream of the optical porthole location. In using just an ordinary hole across which a high velocity, high temperature gas stream flows the compression shock wave is formed in the manner hereinbefore described. The compression shock wave is formed in view of the hole causing the temperature in the air stream in view of and adjacent the hole to greatly increase and the velocity thereof to decrease thereby creating the undesirable results referred to above.

The optical port of the instant invention comprises a porthole which is followed by a trough or channel which is uniquely shaped so as to eliminate this compression shock wave in view of or upstream of the optical porthole location.

It is the primary object of this invention to provide an optical port for use in high velocity gas streams which will prevent the formation of a compression shock wave in view of or upstream of the optical porthole location.

It is a further object of this invention to provide an optical port for use in high velocity gas streams which permits any size optical porthole.

It is another object of this invention to provide an optical port for use in high velocity gas streams which is not affected by the thickness of the boundary layer of the gas stream.

It is still another object of this invention to provide an optical port for use in high velocity gas streams which is economical to produce and which utilizes conventional, currently available components that lend themselves to standard mass production manufacturing techniques.

For a better understanding of the present invention, together with other and further objects thereof, reference is had to the following description taken in connection with the accompanying drawing and its scope will be pointed out in the appended claims.

Description of the drawing

In the drawing:
FIGURE 2 is a fragmentary plan view of this invention;
and
FIGURE 3 is a cross-sectional view of this invention taken along lines III—III of FIGURE 2.

Description of the preferred embodiment

Figure 1:
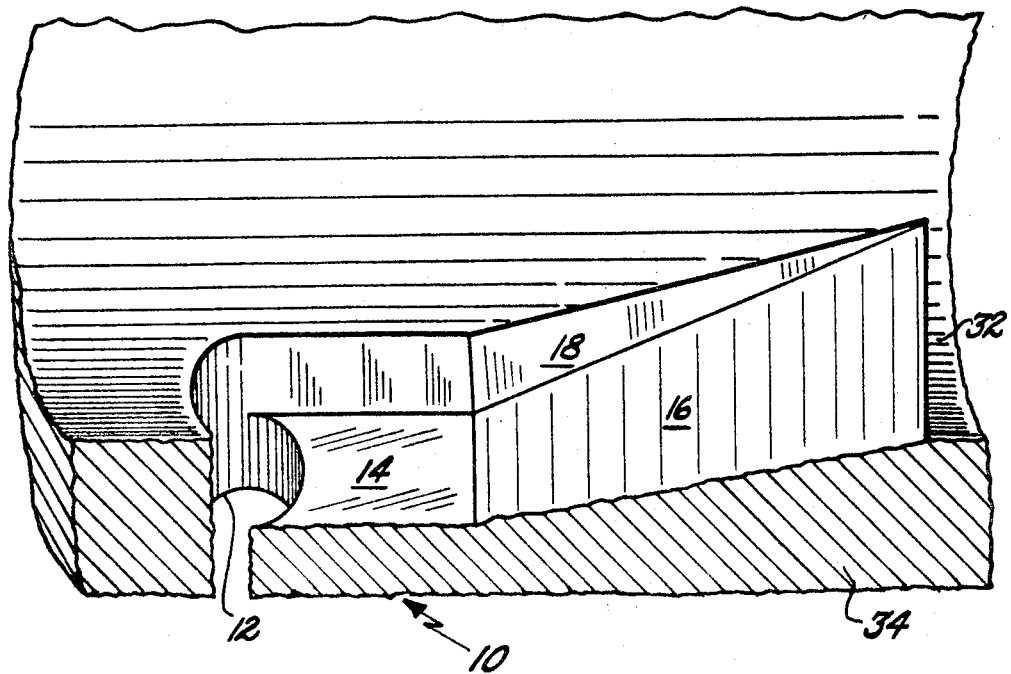
FIGURE 1 represents a fragmentary elevational view, partly in cross-section of this invention taken along line I—I of FIGURE 2.

Referring now to FIGURE 1, we can see that the optical port 10 is made up of a porthole 12 directly followed by a first channel having a straight floor 14 substantially parallel to the inner surface 32 of wall 34 and a second channel having a floor 16, sloping upwardly and terminating at the inner surface 32 of wall 34. The channel having a sloping floor further has diverging side walls 18 and 20 (see FIGURE 2). Although not shown, the outer surface 60 of wall 34 may, if desired, be covered by a suitable transparent material which also covers porthole 12. A lens 22 and two limited rays of light 24 and 26 are included in FIGURE 3, only to show how one type of optical system might be used with this optical port 10.

For a more detailed description of this invention, we now refer to FIGURES 2 and 3. A high velocity (preferably supersonic), high temperature gas stream 38' designated by two streamlines 28 and 30 (see FIGURE 3) flows parallel to the inner surface 32 of wall 34. The porthole 12 of optical port 10 is located in wall 34 adjacent gas stream 38'. As the gas stream approaches the leading edge 40 of porthole 12, an expansion wave 42 causes gradual downward reflection of the gas near the wall surface 32. Using a prior art optical port of large diameter, the reflected gas stream would approach the outer surface or wall of the hole. This would set up an undesirable compression shock wave in view of or upstream of the hole. The instant invention overcomes the above problem and prevents the compression shock wave from forming in view of or upstream of the optical porthole by forming a first channel at point 36 adjacent porthole 12. A compression shock wave 44 is formed when the flow approaches straight floor 14 of the first channel at point 62. The compression shock wave 44 is therefore no longer in view of or upstream of the optical porthole 12. A second channel having a sloping surface 16 is formed at point 48 anywhere beyond the origin point 62 of compression shockwave 44 and a second compression shock wave 46 is formed when the gas stream approaches point 48. The sloping floor 16 also has diverging side walls 18 and 20 (see FIGURE 2) which cause expansion waves 52 and 54 (see FIGURE 2) to form at point 48. Expansion waves 52 and 54 partially cancel the second compression shock wave 46 thus keeping the velocity of the gas stream above sloping floor 16 from reducing too greatly and becoming subsonic. The flow of gas near the surface 32 then parallels sloping surface 16 and exits through an expansion wave 50 formed at point 64, the intersection between sloping wall 16 and inner surface 32.

If, for example, the entering gas stream 38 has a velocity of Mach 2 and the pressure ratio between the pressure in the porthole 12 and the pressure of the free stream of gas stream 38 is 0.5, the following relationships would produce results wherein no compression shock wave would form in view of or upstream of the optical porthole 12 and the exit veloicty of the gas stream would not fall below supersonic.

The distance $h$ between the surface 32 and the origin 36 of straight floor 14 should be at least .2 of the diameter $d$ of the porthole 12. Furthermore, the origin point 48 of sloping floor 16 may be located anywhere downstream of the origin point 62 of compression wave 44, as long as its slope or angle 38' from the horizontal does not exceed 27½°.

Mode of operation

Referring again to FIGURES 2 and 3, a supersonic gas stream 38' is flowing parallel to the surface 32 of wall 34. Two streamlines 28 and 30 are included to show the lessening influence of the porthole with distance. If gas outflow is not permitted from the porthole, the pressure in the optical hole 12 will drop somewhat below the free stream pressure.

Referring now to FIGURE 3, as the moving gas approaches the leading edge 40 of porthole 12, an expansion wave 42 causes gradual reflection of the gas near the wall surface downward into the first channel. A compression shock wave 44 is formed when the flow approaches the straight floor 14 of the first channel. The flow then remains parallel to the floor 14 until reaching a second compression wave 46 originating at the corner 48 where the sloping floor 16 of the second channel starts. The diverging side walls 18 and 20 cause expansion waves 52 and 54 which partially cancel the second compression shock wave 46. This serves to keep the flow above the sloping floor 16 supersonic. The flow near the surface then parallels the sloping floor 16 and exits through the expansion wave 50.

I claim:
1. An optical port in a cooled wall adjacent to a high velocity gas stream comprising a porthole in the wall, a first channel directly adjacent and downstream of said porthole and having a straight floor therein and a second channel directly adjacent said first channel and having an upwardly sloping floor which terminates at the surface of the wall adjacent the gas stream, thereby preventing the formation of a compression shock wave in view of or upstream of said porthole.

2. An optical port as defined in claim 1, wherein said sloping floor has diverging side walls.

3. An optical port as defined in claim 2, wherein said straight floor is substantially parallel to the surface of the wall adjacent the gas stream.

4. An optical port as defined in claim 3, wherein the distance between the surface of the wall adjacent the gas stream and the origin of said straight floor is at least .2 the diameter of said porthole.

5. An optical port as defined in claim 4, wherein the angle between said sloping floor and the horizontal does not exceed 27½ degrees.

References Cited

UNITED STATES PATENTS

| | | | |
|---|---|---|---|
| 2,019,421 | 10/1935 | Link | 137—559 XR |
| 3,115,539 | 12/1963 | Stuessel et al. | 52—221 XR |
| 3,340,890 | 9/1967 | Raskhodoff | 137—559 XR |

HENRY T. KLINKSIEK, Primary Examiner